US009715226B2

(12) United States Patent
Kobayashi (10) Patent No.: US 9,715,226 B2
(45) Date of Patent: Jul. 25, 2017

(54) NUMERICAL CONTROLLER WITH MULTI-CORE PROCESSOR

(71) Applicant: FANUC Corporation, Minamitsuru-gun, Yamanashi (JP)

(72) Inventor: Masanori Kobayashi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 232 days.

(21) Appl. No.: 14/736,545

(22) Filed: Jun. 11, 2015

(65) Prior Publication Data

US 2015/0378341 A1 Dec. 31, 2015

(30) Foreign Application Priority Data

Jun. 27, 2014 (JP) ................................. 2014-133123

(51) Int. Cl.
G05B 19/19 (2006.01)

(52) U.S. Cl.
CPC ...... *G05B 19/19* (2013.01); *G05B 2219/2205* (2013.01); *G05B 2219/37611* (2013.01)

(58) Field of Classification Search
CPC .................................................... G05B 19/19
USPC ........................................ 318/569, 567, 560
See application file for complete search history.

(56) References Cited

U.S. PATENT DOCUMENTS

| 4,956,785 | A |   | 9/1990 | Kawamura et al. |
|---|---|---|---|---|
| 4,987,359 | A | * | 1/1991 | Saitoh ................ G05B 19/182 318/567 |
| 5,252,899 | A |   | 10/1993 | Kawamura et al. |
| 5,386,569 | A | * | 1/1995 | Harada ................ G05B 19/056 717/146 |
| 2010/0161094 | A1 |   | 6/2010 | Crothers |
| 2013/0041510 | A1 |   | 2/2013 | Kurakake et al. |
| 2014/0042950 | A1 |   | 2/2014 | Aoyama et al. |
| 2014/0149020 | A1 |   | 5/2014 | Nakada et al. |

FOREIGN PATENT DOCUMENTS

| JP | S63-181005 A | 7/1988 |
|---|---|---|
| JP | 2000-357008 A | 12/2000 |
| JP | 2009-163527 A | 7/2009 |
| JP | 2012-513070 A | 6/2012 |
| JP | 2013-054730 A | 3/2013 |
| JP | 2014-035564 A | 2/2014 |
| WO | WO-2013-011376 A1 | 1/2013 |

OTHER PUBLICATIONS

Notification of Reasons for Refusal issued Dec. 20, 2016 in Japanese Patent Application No. 2014-133123 (3 pages) with an English translation (2 pages).

* cited by examiner

*Primary Examiner* — David S Luo
(74) *Attorney, Agent, or Firm* — Drinker Biddle & Reath LLP (57) ABSTRACT

A numerical controller with a multi-core processor estimates moving instruction creation processing time required for creation of a moving instruction that is to be executed in a predetermined cycle on the basis of a machining instruction obtained from a machining program and divides a process for creating the moving instruction with respect to cores of the multi-core processor on the basis of the estimated processing time. Consequently, processing performance for the moving instruction creation process is improved.

3 Claims, 7 Drawing Sheets

| FIRST CORE | SECOND CORE | THIRD CORE | FOURTH CORE |
|---|---|---|---|
| MACHINING PROGRAM ANALYSIS PROCESS (FIRST PATH) | MACHINING PROGRAM ANALYSIS PROCESS (SECOND PATH) | DISPLAY PROCESS | PMC PROCESSING |
| MOVING INSTRUCTION CREATION PROCESS (FIRST PATH) | MOVING INSTRUCTION CREATION PROCESS (SECOND PATH) | | |

| INSTRUCTION FUNCTION | ESTIMATED PROCESSING TIME FOR INSTRUCTION FUNCTION (n: NUMBER OF INSTRUCTION AXES) |
|---|---|
| A | 50 × n + 30 |
| B | 80 × n + 20 |
| C | 300 |
| D | 65 × n + 20 |
| E | 40 × n + 50 |
| F | 45 × n + 60 |
| G | 30 × n + 60 |
| H | 500 |

FIG. 5

[1] ESTIMATED PROCESSING TIME FOR MACHINING PROGRAM ANALYSIS PROCESS (MINIMUM PROCESSING TIME)
[2] ALLOWED TIME FOR MOVING INSTRUCTION CREATION PROCESS
[3] ESTIMATED PROCESSING TIME FOR MOVING INSTRUCTION CREATION PROCESS ALLOCATED TO FIRST CORE
[4] ESTIMATED PROCESSING TIME FOR MOVING INSTRUCTION CREATION PROCESS ALLOCATED TO SECOND CORE
[5] ESTIMATED PROCESSING TIME FOR DISPLAY PROCESS (MINIMUM PROCESSING TIME)
[6] ESTIMATED PROCESSING TIME FOR PMC PROCESSING
[7] ONE CYCLE

FIG. 6

| INSTRUCTION FUNCTION | ESTIMATED PROCESSING TIME FOR INSTRUCTION FUNCTION (n: NUMBER OF INSTRUCTION AXES) | DIVIDED PROCESS |
|---|---|---|
| A | 50×n+30 | 1 |
| B | 80×n+20 | 1 |
| C | 300 | 1 |
| D | 65×n+20 | 2 |
| E | 40×n+50 | 2 |
| F | 45×n+60 | 2 |
| G | 30×n+60 | 3 |
| H | 500 | 3 |

FIG. 7

[1] ESTIMATED PROCESSING TIME FOR MACHINING PROGRAM ANALYSIS PROCESS (MINIMUM PROCESSING TIME)
[2] ALLOWED TIME FOR MOVING INSTRUCTION CREATION PROCESS
[3] ESTIMATED PROCESSING TIME FOR DIVIDED MOVING INSTRUCTION CREATION PROCESS ALLOCATED TO FIRST CORE
[4] ESTIMATED PROCESSING TIME FOR MOVING INSTRUCTION CREATION PROCESS ALLOCATED TO SECOND CORE
[5] ESTIMATED PROCESSING TIME FOR DISPLAY PROCESS (MINIMUM PROCESSING TIME)
[6] ESTIMATED PROCESSING TIME FOR PMC PROCESSING
[7] ONE CYCLE

| FIRST CORE | SECOND CORE | THIRD CORE | FOURTH CORE |
|---|---|---|---|
| MACHINING PROGRAM ANALYSIS PROCESS (FIRST PATH) | MOVING INSTRUCTION CREATION PROCESS (FIRST PATH) | DISPLAY PROCESS | PMC PROCESSING |

FIG. 11

| FIRST CORE | SECOND CORE | THIRD CORE | FOURTH CORE | FIFTH CORE | SIXTH CORE |
|---|---|---|---|---|---|
| MACHINING PROGRAM ANALYSIS PROCESS (FIRST PATH) | MOVING INSTRUCTION CREATION PROCESS (FIRST PATH) | MACHINING PROGRAM ANALYSIS PROCESS (SECOND PATH) | MOVING INSTRUCTION CREATION PROCESS (SECOND PATH) | DISPLAY PROCESS | PMC PROCESSING |

FIG. 12

| FIRST CORE | SECOND CORE | THIRD CORE | FOURTH CORE | FIFTH CORE | SIXTH CORE |
|---|---|---|---|---|---|
| MACHINING PROGRAM ANALYSIS PROCESS (FIRST PATH) | MACHINING PROGRAM ANALYSIS PROCESS (SECOND PATH) | MACHINING PROGRAM ANALYSIS PROCESS (THIRD PATH) | MACHINING PROGRAM ANALYSIS PROCESS (FOURTH PATH) | DISPLAY PROCESS | PMC PROCESSING |
| MOVING INSTRUCTION CREATION PROCESS (FIRST PATH) | MOVING INSTRUCTION CREATION PROCESS (SECOND PATH) | MOVING INSTRUCTION CREATION PROCESS (THIRD PATH) | MOVING INSTRUCTION CREATION PROCESS (FOURTH PATH) | | |

NUMERICAL CONTROLLER WITH MULTI-CORE PROCESSOR

RELATED APPLICATION DATA

This application claims priority under 35 U.S.C. §119 and/or §365 to Japanese Application No. 2014-133123 filed Jun. 27, 2014, the entire contents is incorporated herein by reference.

BACKGROUND OF THE INVENTION

1. Field of the Invention

The present invention relates to a numerical controller with a multi-core processor that enables execution of greater amount of moving instruction creation processes within allowed time.

2. Description of the Related Art

For a numerical controller for controlling a machine tool or an industrial machine, as disclosed in Japanese Patent Application Laid-Open No. 2014-035564, a technology has been proposed that provides a numerical controller with a multi-core processor in which a numerical control processor and a sequence control processor, separated conventionally, are integrated as one of multiple cores of one processor for purpose of cost reduction and that connects the processor and a peripheral control LSI through a high-speed serial bus to reduce the number of pins in the LSI and enable integration of peripheral control LSI.

Japanese Patent Application Laid-Open No. 2009-163527 discloses a system that attains multi-OS by introducing a multi-core into an embedded system for purpose of improvement in processing performance, wherein dynamic load distribution among OSs is carried out while suppressing overheads for distributing calculation resources among the OSs in order to solve a problem of incompatibility between minimization in the overheads for distributing calculation resources among the OSs and the dynamic load distribution among OSs.

Software processes in a numerical controller include a machining program analysis process in which a machining program is analyzed, moving instruction creation process in which a moving instruction to motors is created, a display process in which status of the numerical controller, a machine tool, and the like is displayed on a display, a PMC (programmable machine controller) process in which input and output of signals to and from the machine tool, sequence processes, and the like are carried out.

Among these processes, the moving instruction creation process has to be carried out without fail so as to be completed in each cycle in order that the instructions to the motor may be given uninterruptedly. Throughputs of the moving instruction creation process for processes relating to axes, paths, and the like have been increasing year by year because of demands for multi-axis, multi-path, and high-performance machine tools. Shortening in processing cycle is also demanded in order to attain machining at higher speed and with higher accuracy. That is, execution of greater amount of processes in shorter time period is demanded in the moving instruction creation process. It is necessary to increase processing capacity per unit time in order to address such demands.

As a method for addressing such demands, it is conceived that a processor with high operating frequency or a large number of cores is employed for devices with multi-core processors as disclosed in Japanese Patent Application Laid-Open No. 2014-035564 and Japanese Patent Application Laid-Open No. 2009-163527 that have been described above. The high operating frequency, however, makes a problem in that increase in heat generated by the processor may cause malfunction in the numerical controller. The processor with a large number of cores makes a problem in that the processor is expensive and causes overall cost increase.

SUMMARY OF THE INVENTION

An object of the present invention is to provide a numerical controller in which a multi-core processor is used and which enables execution of greater amount of moving instruction creation processes within allowed time.

The present invention relates to a numerical controller with a multi-core processor that controls a machine tool by execution of a machining program. The numerical controller includes a moving instruction creation processing time estimation unit that estimates moving instruction creation processing time required for creation of a moving instruction that is to be executed in a predetermined cycle on the basis of a machining instruction obtained from the machining program and a moving instruction creation process division unit that divides a moving instruction creation process for creating the moving instruction with respect to cores of the multi-core processor on the basis of the moving instruction creation processing time estimated by the moving instruction creation processing time estimation unit.

The moving instruction creation processing time estimation unit may be configured to estimate the moving instruction creation processing time on the basis of at least one of an instruction function and a number of instruction axes that are processed on the basis of the machining instruction.

The moving instruction creation process division unit may be configured to divide the moving instruction creation process for the cores of the multi-core processor on the basis of division information allocated to each instruction function of the machining instruction.

According to the present invention in which the processing time for the moving instruction creation process is estimated by the numerical controller with use of the multi-core processor and in which the moving instruction creation process is then divided and subjected to processing in the cores in case of excess over the allowed time, processing performance for the moving instruction creation process can be improved and demands for multi-axis, multi-path, and high performance machine tools can be addressed.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
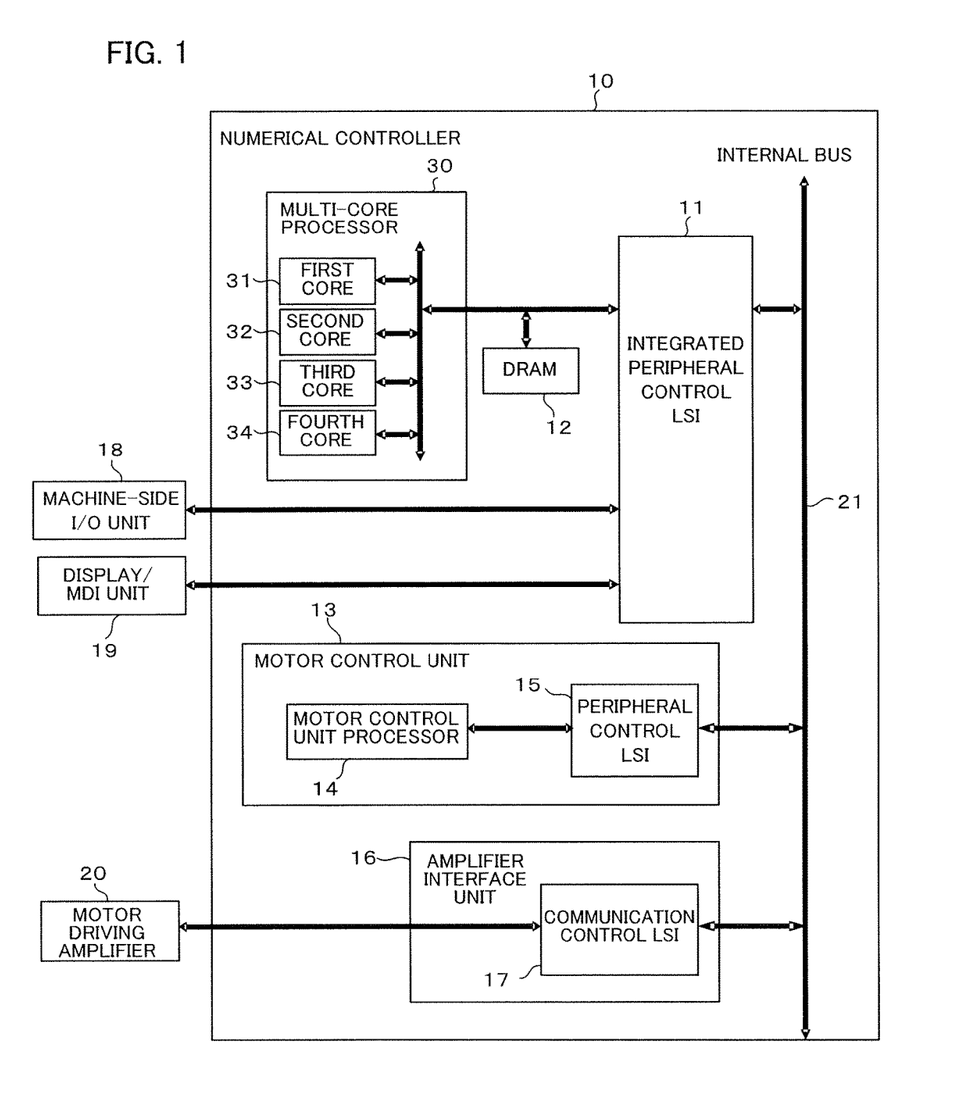
FIG. 1 is a schematic block diagram for illustrating an embodiment of a numerical controller with a multi-core processor according to the present invention.

An embodiment of a numerical controller with a multi-core processor according to the present invention will be described with reference to FIG. 1.

A numerical controller 10 is mounted with a multi-core processor 30 and an integrated peripheral control LSI 11 and includes a motor control unit 13 and an amplifier interface unit 16. These elements are connected to one another through an internal bus 21. The motor control unit 13 includes a motor control unit processor 14 and a peripheral control LSI 15 therefor. The amplifier interface unit 16 is an interface that carries out communication with a motor driving amplifier 20. The multi-core processor 30 includes four cores 31 through 34. The numerical controller 10 further includes a shared memory that is used for inter-core communication for information sharing among the cores 31 through 34. A DRAM 12 is used as the shared memory, for instance.

The multi-core processor 30 analyzes a machining program for controlling the motor driving amplifier 20 connected to the numerical controller 10, by executing a machining program analysis process, creates a moving instruction by executing a moving instruction creation process on the basis of analysis results, and transmits the created moving instruction to a RAM (not illustrated) inside the peripheral control LSI 15 of the motor control unit 13 via the integrated peripheral control LSI 11 and the internal bus 21.

The motor control unit processor 14 of the motor control unit 13 reads the moving instruction written into the internal RAM, creates data for motor control that is to be transmitted to the motor driving amplifier 20, and writes the created data into a communication control LSI 17 of the amplifier interface unit 16 via the internal bus 21.

The communication control LSI 17 of the amplifier interface unit 16 transmits the data, written into a RAM inside the communication control LSI 17, to the motor driving amplifier 20 and the motor driving amplifier 20 drives motors (not illustrated) provided in a machine tool.

The multi-core processor 30 executes a PMC processing in which a specified sequence control program is executed on the basis of input data or the like from a machine (not illustrated) connected to the numerical controller 10. Then signals for controlling components of the machine are transmitted to a machine-side I/O unit 18 on the basis of results of the PMC processing.

A display/MDI unit 19 is a manual data input device including a display, a key board, or the like. The integrated peripheral control LSI 11 receives an instruction, data, and the like from a keyboard, passes the instruction, the data, and the like to the multi-core processor 30, and outputs a display instruction, outputted from a display process executed in the multi-core processor 30, to a display of the display/MDI unit 19.

Figure 2:
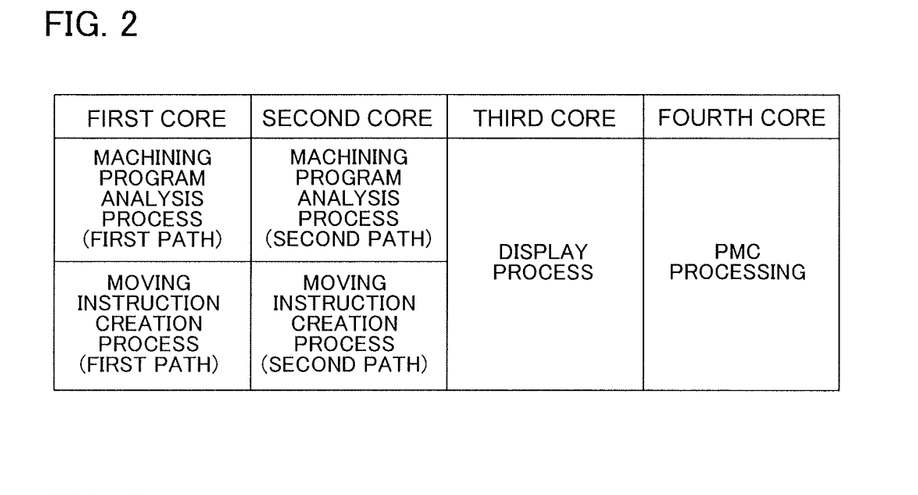
FIG. 2 is a diagram illustrating an example of allocation of processes in the numerical controller of FIG. 1 to cores of the multiprocessor mounted in the numerical controller.

It is assumed that multi-path control in which there are two instruction paths for the machining program is performed in the embodiment. FIG. 2 illustrates an example in which the machining program analysis process and the moving instruction creation process for the first path are allocated to the first core 31, in which the machining program analysis process and the moving instruction creation process for the second path are allocated to the second core 32, in which the display process is allocated to the third core 33, and in which the PMC processing is allocated to the fourth core 34.

In the machining program analysis process, the machining program is analyzed and information such as type of a route (linear or arcuate, and the like), axes subjected to the instruction, and moving velocity is acquired. In the moving instruction creation process, positions of motors pursuant to a machining route specified in the instruction are calculated from the analysis results of the machining program analysis process and the moving instructions are given to the motors. The moving instruction creation process has to be carried out without fail so as to be completed in each cycle in order that the instructions to the motors may be given uninterruptedly. The machining program analysis process is carried out in remainder time after execution of the moving instruction creation process in one cycle.

Figure 3:
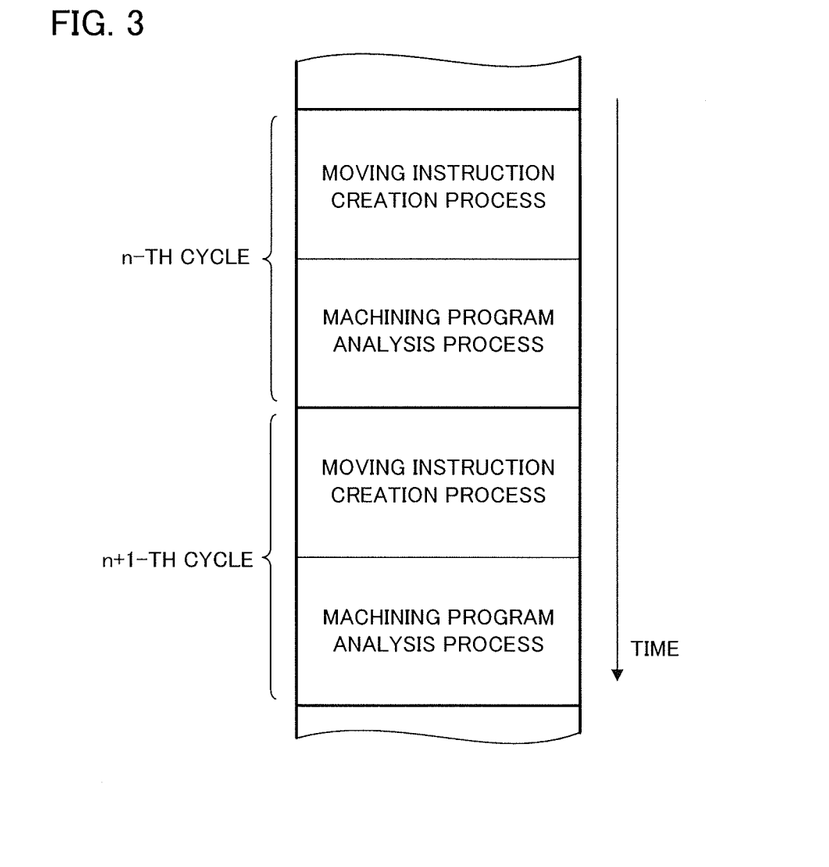
FIG. 3 is a diagram illustrating an execution sequence of machining program analysis processes and moving instruction creation processes in each core of the multiprocessor mounted in the numerical controller of FIG. 1.

FIG. 3 is a diagram illustrating a time-series sequence in which the machining program analysis processes and the moving instruction creation processes in n-th cycle and n+1-th cycle are executed in the first core and the second core.

As illustrated in FIG. 3, the moving instruction creation process in the n+1-th cycle is executed on the basis of analysis results of the machining program analysis process in the n-th cycle.

Accordingly, the embodiment will be described below with use of an example in which the moving instruction creation process in the n+1-th cycle is executed on the basis of the analysis results of the machining program analysis process in the n-th cycle.

In the machining program analysis process, the machining program of a plurality of blocks may be analyzed in one cycle. Then the moving instruction creation processes in cycles later than the n+1-th cycle may be executed on the basis of the analysis results of the machining program analysis process in the n-th cycle. The present invention can still be applied to this example.

Subsequently, a method of calculating estimated processing time for the moving instruction creation process will be described.

Initially, instruction functions and number of instruction axes that are to be processed in the moving instruction creation processes in the n+1-th cycle are obtained by the analysis of the machining program in the machining program analysis process in the n-th cycle. Subsequently, the estimated processing time for the moving instruction creation process in the n+1-th cycle can be calculated with use of a table illustrated in FIG. 4, from the instruction functions and the number of the instruction axes that are to be processed in the n+1-th cycle.

Figure 4:
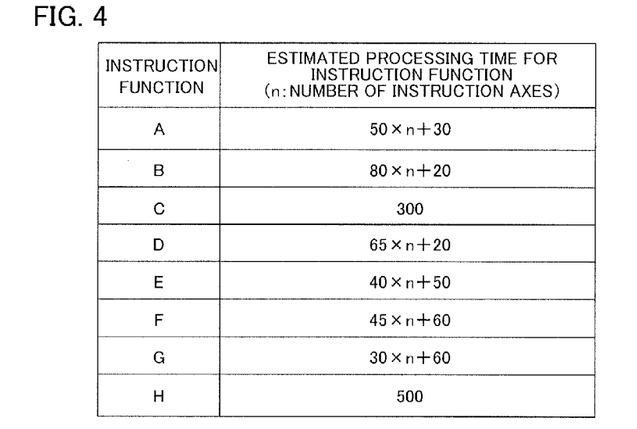
FIG. 4 is a table illustrating relation between types of instruction functions and expressions for calculating estimated processing times for the instruction functions.

FIG. 4 is the table illustrating relation between types of the instruction functions and expressions for calculating the estimated processing times for the instruction functions.

The instruction functions A through H in the table of FIG. 4 constitutes a function group that is processed in the moving instruction creation process and a plurality of instruction axes are objects to be instructed. In the moving instruction creation process, the estimated processing time required for creation of moving instruction to each of the instruction axes from each instruction function is represented by an expression in which the number n of the instruction axes that are the object of the instruction function is included as a variable.

In the machining program analysis process in the n-th cycle, the estimated processing time for the moving instruction creation process in the n+1-th cycle can be found by calculating the processing times for the instruction functions that are to be processed in the n+1-th cycle, in accordance with the table of FIG. 4, and summing up those processing times.

The expressions that represent the estimated processing times for the instruction functions are found in advance as approximate expressions on the basis of change (increase and decrease) in processing time which occurs when an instruction function is instructed with use of various numbers of the instruction axes in an experiment or the like. For the functions that do not depend on the number of the instruction axes, the number n of the instruction axes is not included in the expressions for the estimated processing times for the instruction functions.

As described above, the machining program analysis process is carried out in remainder time after execution of the moving instruction creation process in one cycle. The processing time for the machining program analysis process is indefinite because contents of the machining program analysis process can dynamically be altered so that minimum process may suffice as situation demands in order to allow the machining program analysis process to be carried out in the remainder time after execution of the moving instruction creation process. Providing minimum processing time that is desired to be secured is predetermined, however, the minimum processing time may be used as the estimated processing time for the machining program analysis process.

The display process is a process in which various items of information are displayed on the display for observation of status of the numerical controller, the machine tool, and the like. If processing time for the display process in a given cycle is shortened, time required for update of display on a screen is extended but no problem is caused in control over the machine. Therefore, minimum processing time that is desired to be secured may be determined in advance and may be set as estimated processing time for the display process.

The PMC processing is a process in which input and output of signals, sequence processes, and the like that directly relate to the control over the machine tool are carried out. Accordingly, processing capacity of the core has no reserve capacity enough to spare for distributed processing of other processes. In such a case, estimated processing time may be set to be equal to cycle time.

Subsequently, a process will be described which divides moving instruction creation process for causing distributed processing to be carried out in other cores in case where estimated processing time for moving instruction creation process exceeds allowed time. The process is executed as a core allocation process on any of the cores.

The allowed time for the moving instruction creation process is defined as a value given by subtraction of the minimum processing time for the machining program analysis process from the cycle time of one cycle. In case where the estimated processing time for the moving instruction creation process exceeds the allowed time for the moving instruction creation process, the moving instruction creation process is divided and subjected to the distributed processing in each of the cores.

Figure 5:
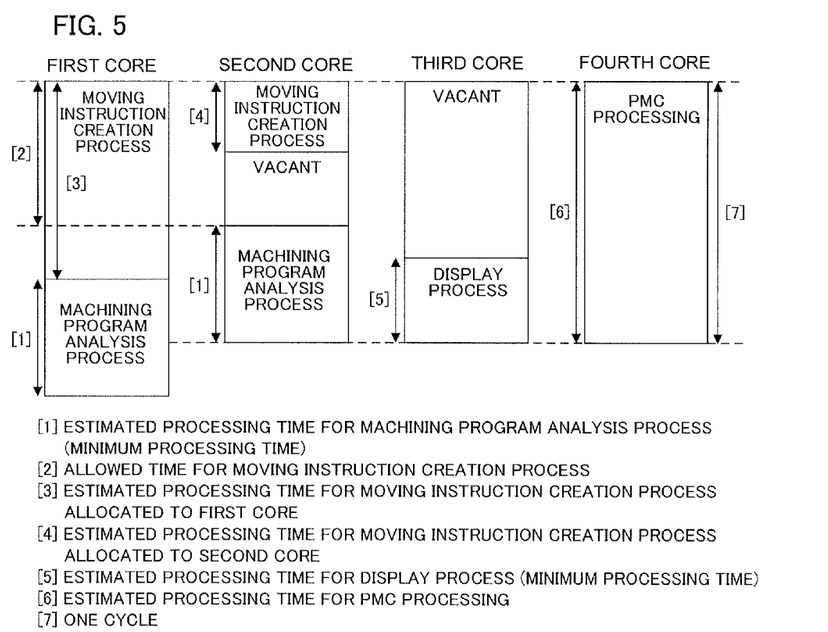
FIG. 5 is a diagram illustrating estimated processing time for the processes that are executed on the cores of the multiprocessor mounted in the numerical controller of FIG. 1 and vacant time in one cycle.

FIG. 5 illustrates the estimated processing time for the processes that are executed on the cores of the multiprocessor and vacant time (reserve) in one cycle.

FIG. 5 illustrates an example in which the estimated processing time ([3]) for the moving instruction creation process exceeds the allowed time ([2]) for the moving instruction creation process in the first core (that is, [2]<[3]). When it is estimated in the machining program analysis process carried out in previous cycle that such status as illustrated in FIG. 5 will be brought about, a process of dividing the moving instruction creation process in the first core in which the estimated processing time for the moving instruction creation process exceeds the allowed time is executed.

Figure 6:
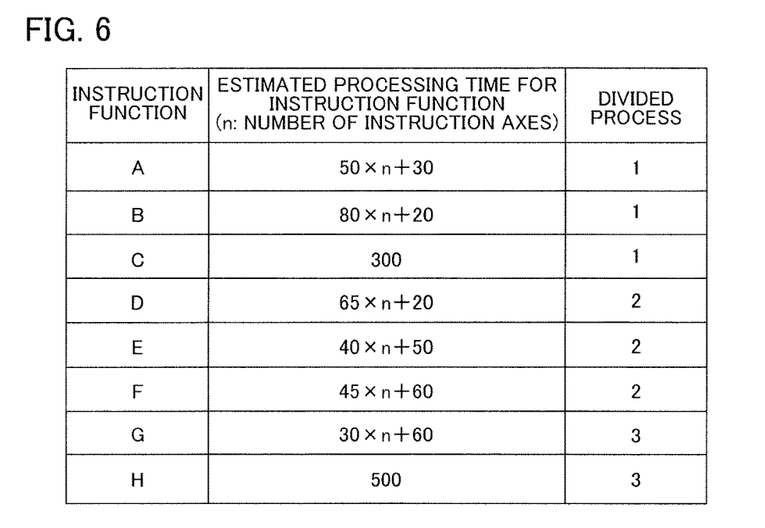
FIG. 6 is a diagram illustrating an example in which allocation of function groups (instruction functions) in the moving instruction creation process to divided processes is stored as numbers of the divided processes associated with the instruction functions.

How the moving instruction creation process is to be divided, that is, which divided process each function group (instruction function) of the moving instruction creation process is to be allocated to is determined in advance, associated with the instruction function as illustrated in a table of FIG. 6, and stored as a number of the divided process. In the process of dividing the moving instruction creation process, moving instruction creation processes for the instruction functions (function groups) are grouped by the numbers of the divided processes in a divided process column provided in the table of FIG. 6 and are accordingly divided. An example of FIG. 6 signifies that the moving instruction creation process is divided into three divided processes 1 through 3. For acquisition of execution time for each divided process, estimated processing time for instruction functions allocated to the divided process is totaled in accordance with the table of FIG. 6.

The estimated processing time in the cores and the estimated processing time for the divided processes under a condition that the estimated processing time for the moving instruction creation process exceeds the allowed time are found from above and then a process of allocating the divided processes to the cores so as to prevent the processing time in the cores from exceeding the given cycle is executed.

Figure 7:
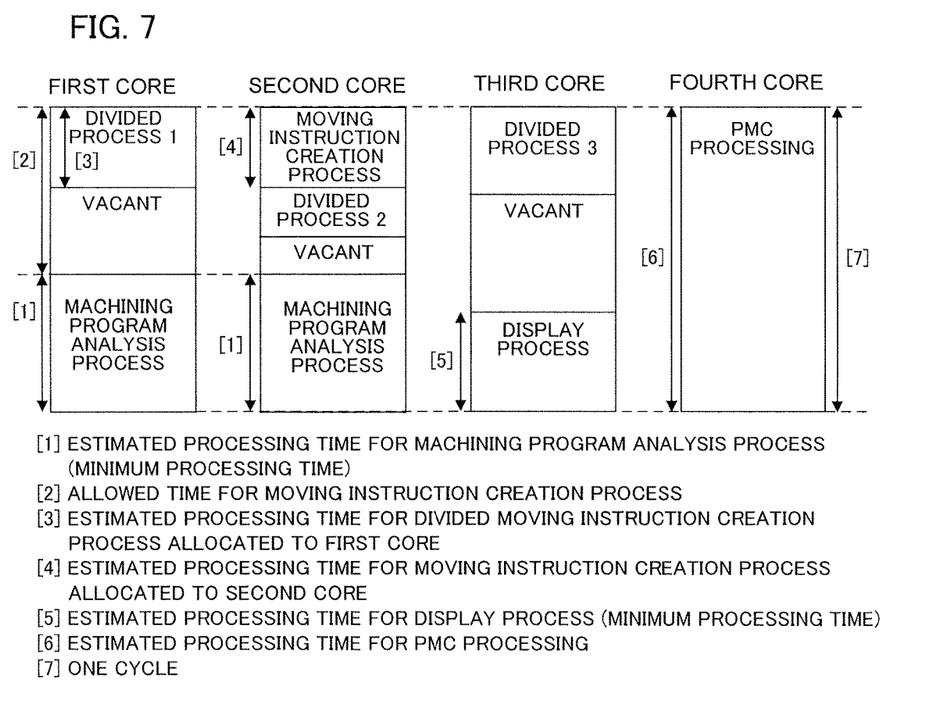
FIG. 7 is a diagram illustrating estimated processing time in the cores and vacant time in one cycle in status in which the divided processes have been allocated to the cores so that processing time in the cores of the multiprocessor mounted in the numerical controller of FIG. 1 may not exceed the given cycle.

FIG. 7 is a diagram illustrating estimated processing time in the cores and vacant time (reserve) in one cycle in status in which the divided processes have been allocated to the cores so that the processing time in the cores does not exceed the given cycle.

Figure 8:
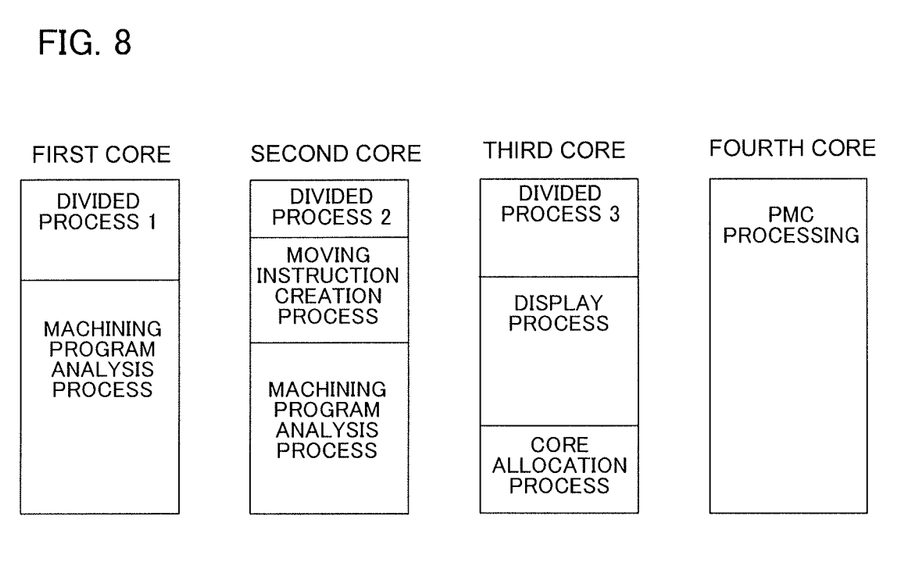
FIG. 8 is a diagram illustrating an example of allocation of a core allocation process to the cores of the multiprocessor mounted in the numerical controller of FIG. 1.

A core that executes the core allocation process for determining allocation of the divided processes may be a core that has the longest vacant time on occasion when the processing time is estimated or may be any core that is fixedly predetermined. In case where the core allocation process is executed by the third core, for instance, the actual process in the n+1-th cycle is executed as illustrated in FIG. 8.

Figure 9:
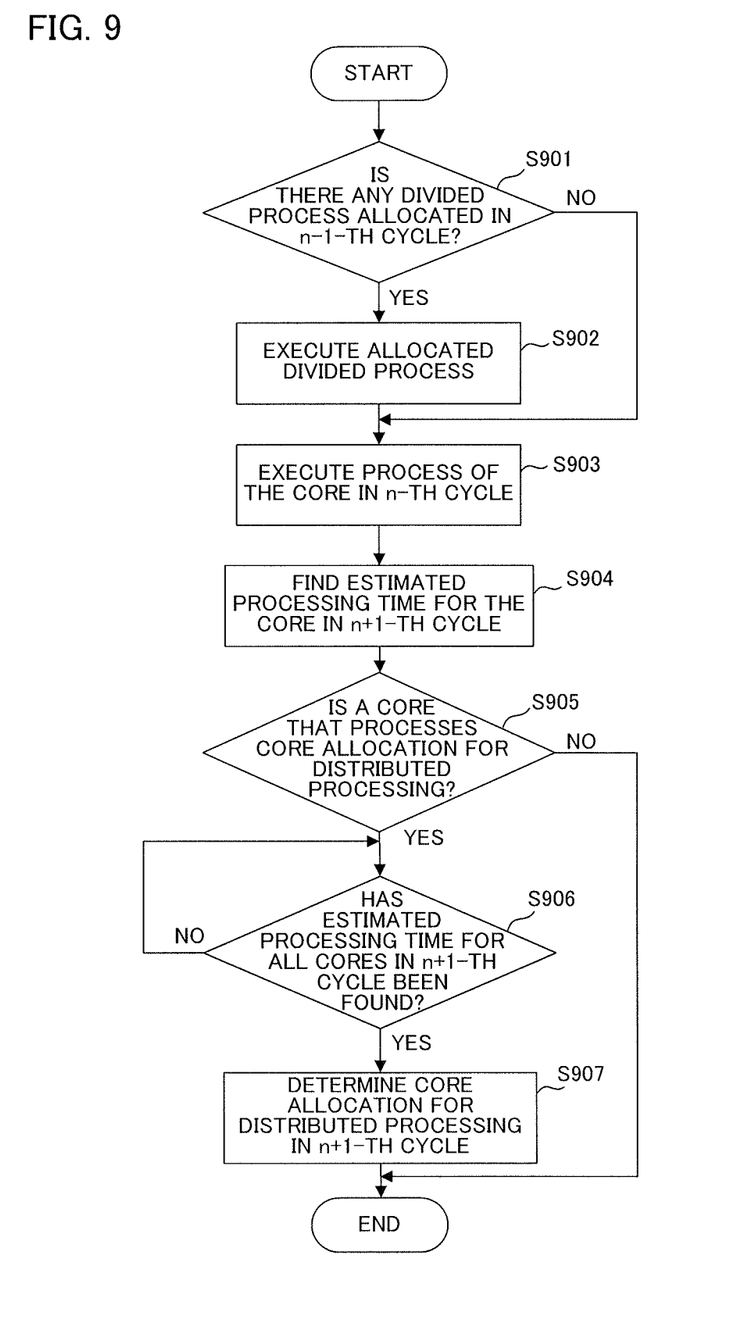
FIG. 9 is a flow chart illustrating a sequence of operation processes that are executed in each core of the multiprocessor mounted in the numerical controller of FIG. 1.

FIG. 9 is a flow chart of the processes that are executed in the n-th cycle in each core the multiprocessor includes. Each core the multiprocessor includes operates when each cycle is started in accordance with the flow chart.

[Step S901] It is determined whether there is any divided process allocated to the core in the core allocation process in n−1-th cycle or not. If there is any divided process allocated to the core, the flow proceeds to step S902. If there is not any divided process allocated to the core, the flow proceeds to step S903.

[Step S902] The divided process allocated to the core is executed.

[Step S903] The process to be executed by the core in the n-th cycle is executed.

[Step S904] The estimated processing time for the core in the n+1-th cycle is found. The estimated processing time that has been found is stored in the shared memory.

[Step S905] It is determined whether the core is a core to process a core allocation for the distributed processing (the core that executes the core allocation process) or not. If the core is a core to process the core allocation for the distributed processing, the flow proceeds to step S906. If the core is not a core to process such core allocation, the process of the core in the n-th cycle is ended.

[Step S906] It is determined whether the estimated processing time for all the cores in the n+l-th cycle has been found or not. The flow proceeds to step S907 when the estimated processing time for all the cores in the n+1-th cycle is found.

[Step S907] The core allocation for the distributed processing in the n+1-th cycle is determined.

Figure 10:
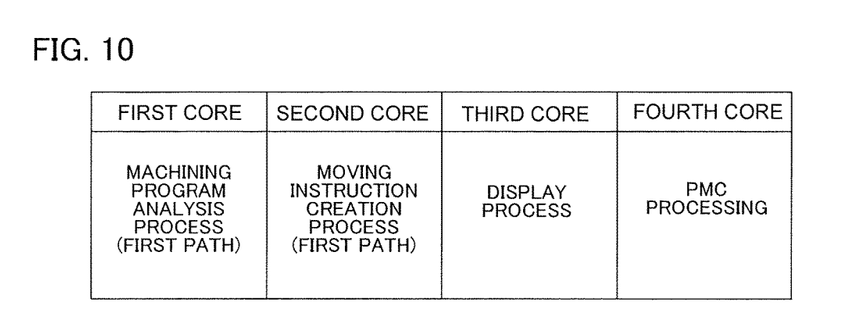
FIG. 10 is a diagram illustrating an example of allocation of a machining program analysis process and a moving instruction creation process on the same path to different cores in a technique of the present invention.
Figure 11:
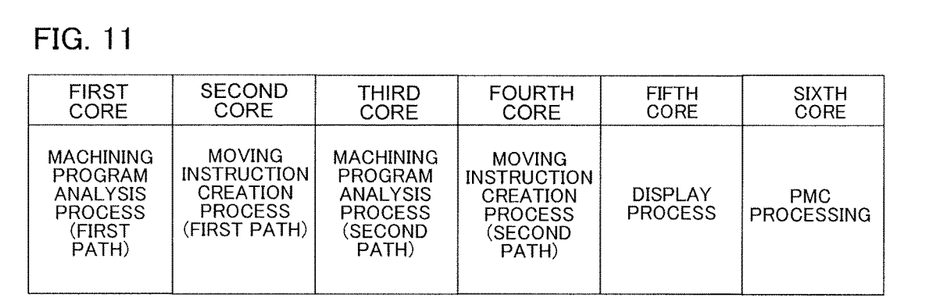
FIG. 11 is a diagram illustrating an example in which the technique of the present invention is applied to a six-core processor and in which machining program analysis processes and moving instruction creation processes on the same paths are allocated to different cores.
Figure 12:
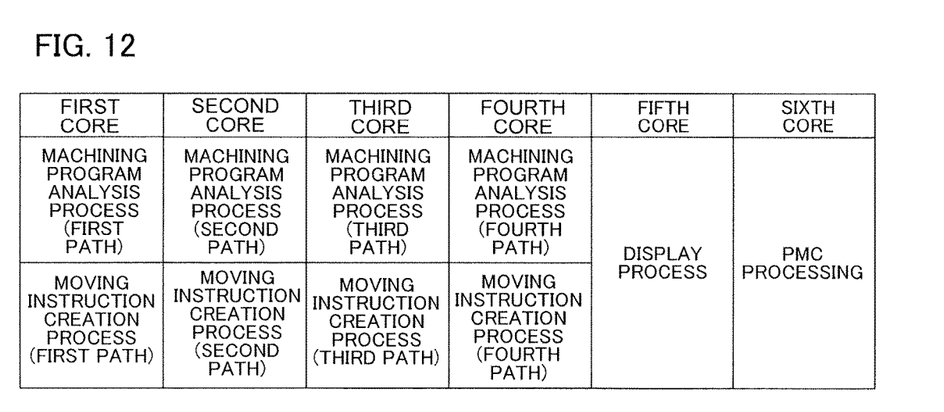
FIG. 12 is a diagram illustrating an example in which the technique of the present invention is applied to a numerical controller that carries out control on four paths with use of a six-core processor.

Though one embodiment of the present invention has been described above, the present invention is not limited to the embodiment described above and can be embodied in other manners with appropriate modification. For instance, allocation of the processes may be carried out so that the machining program analysis process and the moving instruction creation process are allocated to different cores (FIGS. 10 and 11). The number of the cores is not limited to four and the present invention can be applied to examples that have a greater number of cores (FIGS. 11 and 12).

The invention claimed is:

1. A numerical controller with a multi-core processor that controls a machine tool by execution of a machining program, the numerical controller with the multi-core processor comprising:
   a moving instruction creation processing time estimation unit that estimates moving instruction creation processing time required for creation of a moving instruction that is to be executed in a predetermined cycle on the basis of a machining instruction obtained from the machining program, and
   a moving instruction creation process division unit that divides a moving instruction creation process for creating the moving instruction with respect to cores of the multi-core processor on the basis of the moving instruction creation processing time estimated by the moving instruction creation processing time estimation unit.

2. The numerical controller with the multi-core processor according to claim 1, wherein the moving instruction creation processing time estimation unit is configured to estimate the moving instruction creation processing time on the basis of an instruction function and/or a number of instruction axes that are processed on the basis of the machining instruction.

3. The numerical controller with the multi-core processor according to claim 1, wherein the moving instruction creation process division unit is configured to divide the moving instruction creation process for the cores of the multi-core processor on the basis of division information allocated to each instruction function of the machining instruction.

* * * * *